United States Patent [19]
Klein et al.

[11] Patent Number: 5,632,017
[45] Date of Patent: May 20, 1997

[54] TELECONTROLLABLE COMMUNICATION SYSTEM HAVING A REMOTE TRANSMISSION MODULE

[75] Inventors: Josef Klein, Dietramszell; Klaus Stinner, Rohrbach, both of Germany

[73] Assignee: Siemens Aktiengesellschaft, Munich, Germany

[21] Appl. No.: 265,141

[22] Filed: Jun. 24, 1994

[30] Foreign Application Priority Data

Jun. 28, 1993 [DE] Germany .......................... 43 21 481.9

[51] Int. Cl.⁶ .......................... G06F 15/16; G06F 15/163
[52] U.S. Cl. .............. 395/200.09; 395/800; 395/200.02; 395/200.03; 395/200.05; 364/DIG. 1; 364/DIG. 2; 370/524; 379/98
[58] Field of Search .................... 395/309, 800, 395/442, 200.02, 600, 200.09, 200.03, 200.05; 364/DIG. 1, DIG. 2; 379/98, 214, 96, 84, 97, 361; 370/80, 67, 110.1

[56] References Cited

U.S. PATENT DOCUMENTS

| | | | |
|---|---|---|---|
| 4,210,783 | 7/1980 | Vicari et al. | 379/214 |
| 4,431,867 | 2/1984 | Heatherington | 379/98 |
| 4,440,988 | 4/1984 | Heatherington | 379/361 |
| 4,549,302 | 10/1985 | Heatherington | 379/97 |
| 4,586,157 | 4/1986 | Rector et al. | 395/442 |
| 4,740,955 | 4/1988 | Litterer et al. | 370/67 |
| 4,768,188 | 8/1988 | Barnhart | 370/80 |
| 5,047,923 | 9/1991 | Elstner et al. | 395/600 |
| 5,228,076 | 7/1993 | Hopner et al. | 379/96 |

FOREIGN PATENT DOCUMENTS 61-001198  7/1986  Japan .

OTHER PUBLICATIONS

"D60 and D70 Digital Switching System Evolution" by Kichiro Akino et al., Japan Telecommunications Review, vol. 26 (1984) Oct., pp. 227–235.
"Das AXE–System in einer ISDN–und Swissnet–1–Umgebung", G. Bieri et al., Hasler–Mitteilungen, No. 2 (1987) Bern Schweiz, pp. 25–34.

*Primary Examiner*—Daniel H. Pan
*Attorney, Agent, or Firm*—Hill, Steadman & Simpson

[57] ABSTRACT

A communication system equipped with a central computer means is connected to a service central via a communication network, for example, a telephone network of ISDN network, for telecontrol thereof. For the information exchange between the service central and the communication system, a teletransmission module is arranged in the latter, this telecommunication module being connected to the central computer means via a computer/bus interface and via a PCM-oriented system/bus interface. An information transmission via different communication networks, preferably via the telephone network or via the ISDN network, can be set using the teletransmission module. Due to the central arrangement of the teletransmission module with different information transmission procedures for different communication networks and due to the control of the call setup and cleardown for different communication networks by the central computer means that is possible as a result thereof, externally connectable transmission equipment (for example, modems) including a call setup and cleardown controller provided for this purpose can be eliminated.

20 Claims, 2 Drawing Sheets

TELECONTROLLABLE COMMUNICATION SYSTEM HAVING A REMOTE TRANSMISSION MODULE

The present invention is directed to a telecontrollable communication system having a central computer means to which can be connected via at least one PCM-oriented system bus interface subscriber line equipment, that is connectable to communication terminal equipment, and at least one trunk line unit. The communication system can be connected via a communication network to a service central for the purpose of an information exchange for telecontrol of the communication system.

U.S. Pat. No. 5,047,923, hereby incorporated by reference discloses a communication system in which an administration and maintenance terminal (usually realized by a V.24 interface) is provided for the operation, the administration, and the maintenance and diagnosis of the communication system. Information communicated to or from an operations unit (for example an operator personal computer) connected to this operating interface is transmitted directly from or to the central computer means of the communication system via this administration and maintenance terminal.

The telecontrol, that is, the teleoperation, the telemaintenance, the teleadministration and the telediagnosis, is effected in that the administration and maintenance interface is conducted via a private or public network to a service central. The transmission of the information to be communicated is implemented with a transmission equipment with whose assistance the digital information for the telecontrol of the communication system which is to be communicated is converted such that this information can be transmitted via, for example, the telephone network (that is, analog information transmission and telephone signaling) or via an ISDN network (integrated services digital network) that is, digital information transmission and ISDN signaling. For the call setup and cleardown of the connections for telecontrol of the communication system, a considerable circuit-oriented and program-oriented outlay is required both in the communication systems or, respectively, in the service central as well as in the transmission equipment.

SUMMARY OF THE INVENTION

The present invention is based on the object of enabling the information exchange required for telecontrol of communication systems by a service central, taking an optimally low, additional outlay into consideration in the initially cited communication systems via communication networks having different signaling and transmission.

In general terms the present invention is a telecontrollable communication system having a central computer means to which subscriber line equipment, which is connectable to communication terminal equipment, and at least one trunk line unit are connectable via at least one PCM-oriented system bus interface. For an information exchange for the telecontrol of the communication system, the communication system is connected to a service central via a communication network. For the information exchange with the service central, a teletransmission module that can be set to an information transmission specifically associated to a communication network and signaling is arranged in the communication system. A computer/bus interface is realized in the teletransmission module and is connected to a computer/bus interface of the central computer means via the computer/bus interfaces useful and control information are transmitted according to a protocol. A PCM-oriented system/bus interface is realized in the teletransmission module. The PCT-oriented system/bus interface of the central computer means and the useful and signaling information is communicated thereover.

An important aspect of the communication system of the present invention is that the information exchange between the central computer means and the service central can be implemented via communication networks having different signaling and information transmission with a single teletransmission module that is directly allocated to the central computer means of the computer system. The teletransmission module and the central computer means each respectively have a bus/computer interface and a PCM-oriented system bus interface that are respectively connected to one another. On the one hand, the central computer means is initiated via the bus/computer interface to accept the information given reception of information from the service central that effect the telecontrol of the respective communication system and, on the other hand, the teletransmission module is initiated to transmit, that is, to send the information, given the communication of information from the central computer means to the service central. A protocol for the communication of the useful information and control information is employed for this purpose. Protocols wherein control information can be communicated within a serial useful information stream are preferably provided in a telephone network. The ISDN signaling protocol is intended for the ISDN network.

The central computer means usually controls a switching network that is set dependent on a selection or, respectively, signaling procedure executed with the connected communication terminal equipment or a connected communication network. By binding the teletransmission module directly to the central computer means, the switching network can be directly set by the latter given an information communication to the service central. As a result of this measure, an existing trunk line unit of the communication system can be directly connected to a communication network (for example to the telephone network or to the ISDN network). The communication system can be temporarily connected to the service central via this communication network for the purpose of a telecontrol of the communication system. A substantial circuit-oriented and program-oriented outlay is thus eliminated for an operating interface of the communication system equipped with a call setup and cleardown procedure to which a transmission equipment, for example a modem or a ISDN terminal means, must be additionally connected.

The teletransmission module is formed by an access memory, a modem unit, a SICOFI unit, a periphery controller and by a microprocessor system. This division of the functions is directed to an especially advantageous realization on the basis of integrated telecommunications circuits. First, an extremely economical realization and, second, an extremely space-saving realization of the teletransmission module are possible due to the function division adapted to integrated telecommunication circuits. In such an advantageous realization, the teletransmission module is pluggable onto an assembly of the central computer means.

Over and above this, the adjustment to communication networks having different signaling or, respectively, information transmission can be achieved in a simple way, that is, in an especially advantageous way on the basis of this division of the functions. A setting of a telephone network mode with telephone signaling and "analog" information communication and a setting of an ISDN network mode having ISDN signaling and "digital" information communication is preferably provided. The setting is initialized by the central computer means and is effected by the microprocessor system in the teletransmission module. The information flow within the teletransmission module given a telephone network setting is thereby controlled via the SICOFI unit and via the modem unit and, given the ISDN network setting, is controlled directly from the access memory or, respectively, the peripheral controller to the peripheral controller or, respectively, to the access memory. Protocols wherein the control information are communicated within the information stream are preferably provided for the control of the modem unit, that is, control of the modem unit into, for example, a transmission or reception mode. The signalings specifically associated to a communication network are controlled by a trunk line unit arranged in the communication system together with the central computer means.

A signaling channel control, an exchange unit and an interface unit are provided in the peripheral controller of the teletransmission module. The exchange unit represents a switching network acting in the time-slot interchange element for the switching of up to 64 message channels of 64 Kbit/s each, whereby message channels to be switched are supplied to the exchange unit via internal, ISDN-oriented system/bus interfaces. For example, a system/bus interface has four multiplexed, bidirectional 64 Kbit/s message channels into which the information to be communicated are inserted in PCM-coded form.

According to an advantageous development of the telecontrolled communication system, the internal, ISDN-oriented system/bus interface is formed by a respective data line acting in the direction of the central computer means and modem unit, by a respective frame synchronization line communicating frame synchronization signals and by a respective data acceptance line. The digital information to be communicated via the data line is advantageously communicated with a transmission rate of 256 Kbit/s. A frequency of the frame synchronization signals matched to the data transmission rate thereby amounts to 8 kHz, whereby the data acceptance clock on the data acceptance clock line has a frequency of 512 kHz.

According to another advantageous development of the telecontrolled communication system, the modem means is realized according to CCITT Recommendation V.32bis. In particular, the realization is referred to the transmission method recited in CCITT Recommendation V.32bis. Further, data correction and data compression methods according to CCITT Recommendations V.42, V.42bis and NMP2-5 can be implemented. According to CCITT Recommendation V.32bis, the digital information signals are communicated using quadrature amplitude modulation or, respectively, the modulation. A selection procedure recited in the V.32bis recommendation is eliminated since the call setup and cleardown to and from the service central is directly effected by the central computer means of the respective communication system.

As a consequence of the direct connection handling by the central computer means, a service central that telecontrols the respective communication systems can be directly connected to a terminal of a trunk line unit of the communication network via a public or private communication network. The complicated connection to the operating interface of the communication network can be eliminated as a result of this measure and an already existing terminal of a trunk line unit can be used.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
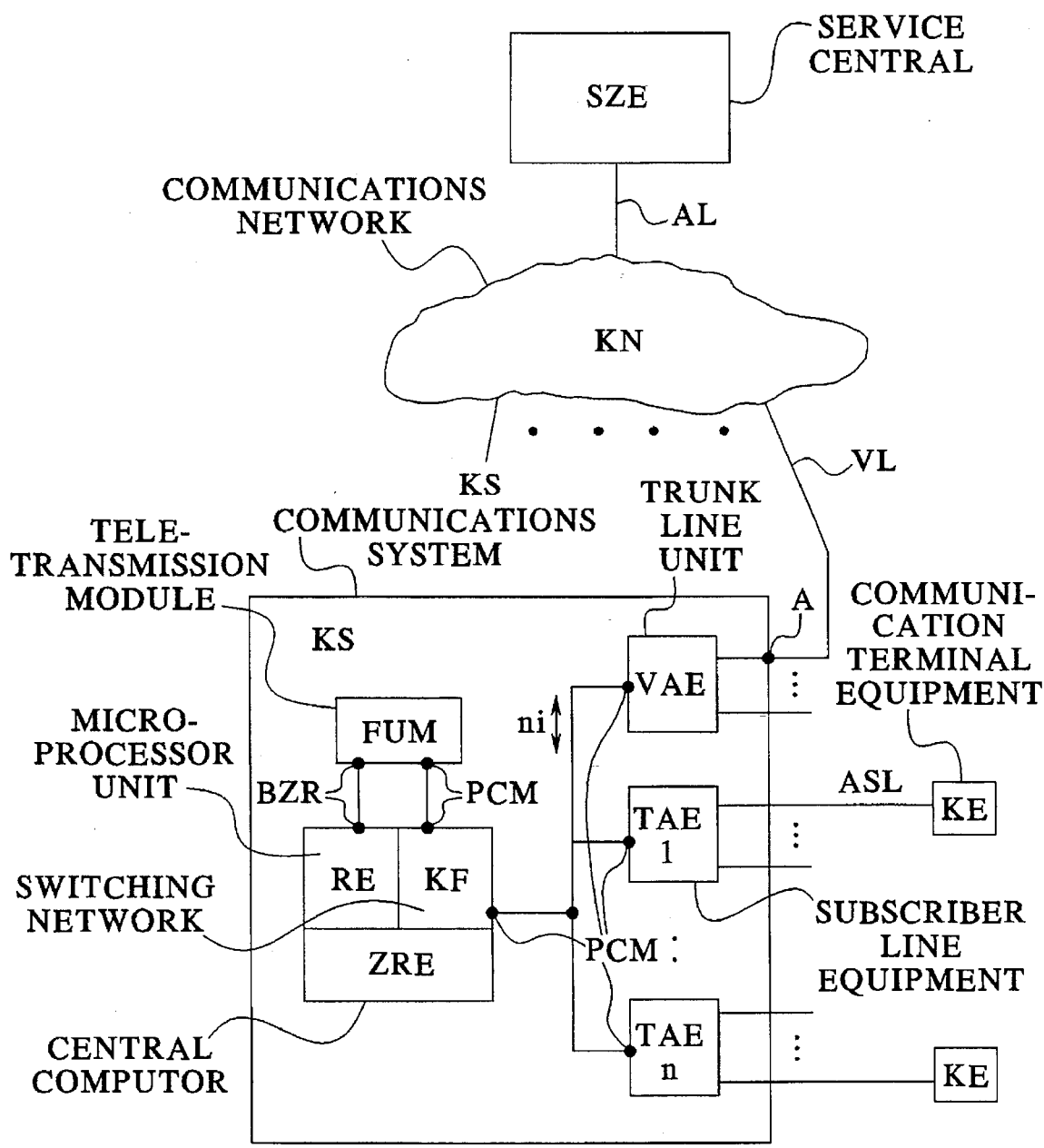
FIG. 1 depicts the connection of a service central to a communication system in a block circuit diagram.

In a block circuit diagram, FIG. 1 shows a service central SZE that is connected via a link AL to a communication network KN that is connected via a trunk VL to a communication system KS. The service central SZE, for example, is realized by a personal computer that is equipped with an access means to the communication network KN. A plurality of communication systems KS (indicated by dots) connected to the communication network KN are telecontrolled with the assistance of this service central SZE, for example, are teleoperated, teleadministered, telemaintained and telediagnosed. To this end, appropriate telecontrol routines realized in program-oriented terms are implemented in the service central SZE.

For example, the communication network represents a telephone network or an ISDN network (integrated services digital network).

In the illustrated communication system KS, the trunk VL coming from the communication network KL is connected to a terminal A of a trunk line unit VAE. The service central SZE as well as the trunk line unit VAE are fashioned in conformity with the provided communication network KN (telephone network or ISDN network). This means a corresponding circuit-oriented and program-oriented realization in view of the physical and procedural properties of the provided communication network KN.

Further, subscriber line equipment TAE1 ... n are arranged in the communication system, communication terminal equipment KE being connected to these subscriber line equipment via subscriber lines ASL. One communication terminal equipment KE is shown by way of example for each subscriber line equipment TAE1 ... n in FIG. 1 and the further communication terminal equipment KE are indicated by dots.

Further, the communication system KS contains a central computer unit ZRE that is formed by a switching network KF and by a computer unit RE. For example, the computer unit RE is realized with a commercially obtainable microprocessor system that is controlled by administration and maintenance programs. The digital switching network KF is formed by PCM-oriented time-shared space switches and/or time-slot interchange elements that switch multiplexed digital information. The central computer means ZRE has a PCM-oriented system/bus interface PCM that is connected to the switching network KF of the central computer means ZRE. This PCM-oriented system/bus interface PCM is connected to the PCM-oriented system/bus interface PCM realized in every trunk line unit or subscriber line equipment VAE, TAE1 ... n. The useful and signaling information ni, si communicated from the communication terminal equipment KE or from the trunks VL are transmitted multiplexed via these PCM-oriented system/bus interfaces PCM. For example, digitized voice information having a transmission rate of 64 Kbit/s are multiplexed in each direction via the PCM-oriented system/bus interface to form a serial bit stream of 4096 Kbit/s, whereby the signaling information are communicated in one of the 64 Kbit/s channels, for example multiplexed or, alternatively, in packets.

A further PCM-oriented system/bus interface PCM and, in addition, a computer/bus interface BZR are additionally realized in the central computer means ZRE. The PCM-oriented system/bus interface PCM is connected to the switching network of the central computer unit ZRE and the computer/bus interface BZR is connected to the computer unit RE of the central computer means ZRE. The novel teletransmission module FUM of the invention is connected to these two interfaces BZR, PCM, to which end this module FUM is equipped with identically realized interfaces BZR, PCM.

Figure 2:
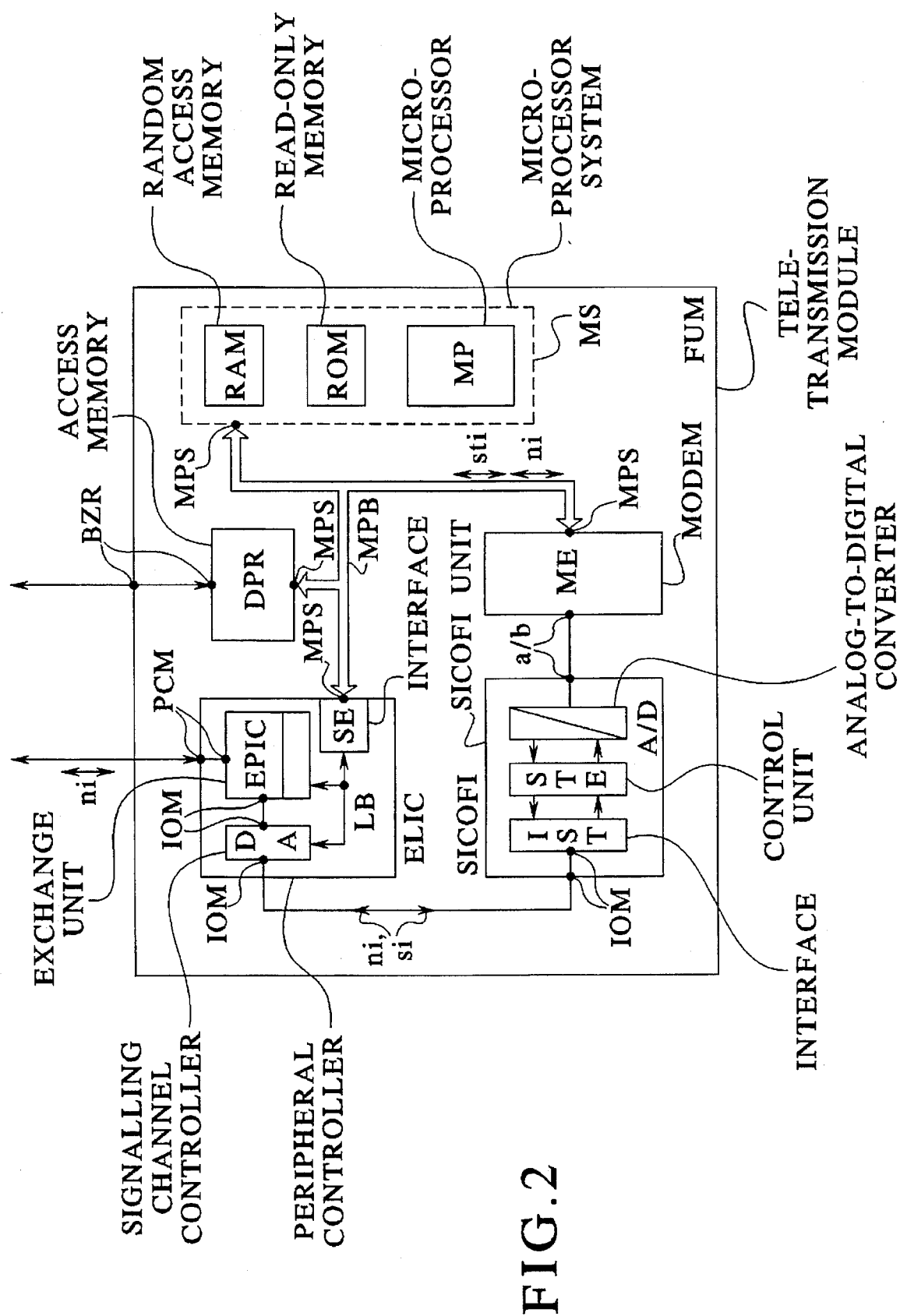
FIG. 2 depicts the structure of a teletransmission module in a block circuit diagram.

FIG. 2 shows the circuit-oriented structure of the teletransmission module FUM in a block circuit diagram. An access memory DPR is provided for the information exchange between the teletransmission module FUM and the central computer means ZRE, this access memory DPR being equipped with a computer/bus interface BZR. The access memory DPR is preferably realized with known dual-port RAMs, whereby the size of the access memory DPR is matched to the quantity of information to be communicated from or to the service central SZE and to the transmission rate. A processor interface MPS provided for the connection of a microprocessor system MS is realized in the access memory DPR. The microprocessor system MS is connected to this processor interface MPS via a microprocessor bus MPB that, for example, is formed by address, control and data lines. The microprocessor system MS indicated with broken lines is realized, for example, by a one-chip microprocessor in which a commercially available microprocessor MP, a read-only memory ROM and a random access memory RAM are contained. Alternatively thereto, the microprocessor system MS can be realized by individual microprocessor and memory circuits. The connection to the microprocessor bus BMP is thereby effected by a microprocessor interface MPS.

The microprocessor bus MPB, further, is conducted to a processor interface realized in an interface unit SE, whereby the interface unit SE is arranged in a periphery controller ELIC. The interface unit SE is connected within the peripheral controller ELIC to an exchange unit EPIC and to a signaling channel controller DA via a local bus LB. A further PCM-oriented system/bus interface PCM is realized in the exchange unit EPIC or, respectively, in the periphery controller ELIC, this further PCM-oriented system/bus interface PCM being conducted to the corresponding interface PCM in the central computer means ZRE. An internal, ISDN-oriented system/bus interface IOM is realized in the signaling channel controller DA for the connection of an SICOFI unit SICOFI. This internal, ISDN-oriented system/bus interface IOM is oriented according to an ISDN-conforming processing of the useful and signaling information ni, si to be communicated. This means that 64 Kbit/s channels are provided for the communication of useful information and transmission channels having lower rates are provided for the communication of signaling. The useful and signaling information ni, si are present in multiplexed form in the internal, ISDN-oriented system/bus interface IOM. The system/bus interface IOM is conducted through the signaling channel controller DA and is conducted to the exchange unit EPIC, whereby the insertion, branching of signaling information si and the blocking or, respectively, allocation of signaling channels are effected in the signaling channel controller DA.

A time slot-controlled switching network is implemented in the exchange unit EPIC, the useful information ni to be communicated being switching therewith to the service central SZE internally within the communication system, that is, being inserted into the corresponding time slot. The inserted useful information ni proceed via the PCM-oriented system/bus interface PCM to the switching network KF of the central computer means ZRE. The useful information ni is switched using the computer unit RE implemented in the central computer means ZRE and using the switching network KF. That is, the useful information ni is forwarded to the trunk line unit VAE and is conducted from the latter to the communication network KN via the terminal A thereof and via the trunk VL. The signaling with the communication network KN is handled in the trunk line unit VAE in accord with the signaling information si communicated from the central computer means ZRE. Analogous thereto, information ni, si communicated from the communication network KN or, respectively, from the service central SZE are communicated to the central computer means ZRE via the trunk line unit VAE and via the PCM-oriented system/bus interface PCM according to the signaling procedure specifically associated to the communication network. In the central computer means ZRE, the signaling information si is interpreted, that is, the recited destination call number is interpreted and, given the identification of a signaling information si that is allocated to the teletransmission module FUM, the useful information ni allocated to this signaling information si is communicated to the teletransmission module FUM via the PCM-oriented system/bus interface PCM.

In this teletransmission module FUM, the useful information ni is switched via the exchange unit EPIC and the signaling channel controller DA to the SICOFI unit SICOFI via the internal, ISDN-oriented system/bus interface IOM. In this SICOFI unit SICOFI, the useful information ni present in digital form is converted into analog telephone signals insofar as the useful information is transmitted via a telephone network. To this end, an interface unit IST wherein an internal, ISDN-oriented system/bus interface IOM is realized is arranged in the SICOFI unit. The useful information ni proceeds via a control means STE to an analog-to-digital converter means A/D wherein the digital useful information ni are converted into analog telephone signals and vice versa. Further, the analog useful information are filtered in the analog-to-digital converter means A/D according to the conditions of an analog telephone interface a/b. The analog telephone interface a/b is consequently realized in the analog-to-digital converter means A/D.

This analog telephone interface a/b is connected to an analog telephone interface a/b identically realized in a modem unit ME. In the modem unit ME, the analog telephone signals are converted into digital information having, for example, the physical properties according to CCITT Recommendation V.32bis and vice versa. For example, the modem unit ME is realized by a set of integrated circuits RC144ACL of the Rockwell Company.

The modem unit ME is also equipped with a processor interface MPS to which the processor bus MPB is connected. The modem unit ME is controlled by the microprocessor system MS via this processor interface MPS. To this end, a declared protocol is provided for the communication of the useful and control information ni, sti. Protocols wherein control information can be communicated within a serial useful information stream are advantageous. For example, such a protocol is disclosed in European reference EP 0 067 395 (corresponding to U.S. Pat. Nos. 4,431,867; 4,440,988; and 4,549,302, all hereby incorporated by reference) wherein the switching between control mode and transmission mode is effected in that a predetermined chronological duration during which no data signals are communicated appears in a predetermined sequence of data signals. The modem unit ME is switched into the required operating conditions using this switching from the communication mode into the control mode on the basis of corresponding control and useful information ni, sti. The control information sti required for this purpose is communicated via the microprocessor system MS and to the modem unit ME. Given, for example, a desired communication of useful information ni to the service central SZE via a telephone network, control information sti is thus formed and is communicated to the modem unit ME. On the basis of this control information sti, the modem unit ME is switched into an operating condition wherein it modulates the useful information ni communicated from the microprocessor system MS according to CCITT Recommendation V.32bis and, consequently, communicates the modulated useful information to the a/b telephone interface a/b as analog useful information ni. Analogous thereto, useful information ni communicated from the service central SZE via the communication network KN and via the trunk line unit VAE as well as by the switching network KF is communicated in the teletransmission module FUM via the periphery controller ELIC, the SICOFI unit SICOFI and the modem unit ME and are intermediately stored in the access memory DPR. From the latter, the central computer means ZRE can fetch the deposited useful information ni via the computer/bus interface BZR and, in accord with the communicated useful information ni, can initialize or, respectively, control the corresponding switching-oriented and administration and maintenance-oriented procedures for the purpose of telecontrol of the communication system KS.

Analogous thereto, useful information ni that is communicated from the central computer means ZRE via the computer/bus interface BZR to the access memory DPR and that is intermediately stored therein is switched to the switching network using the microprocessor system MS via the modem unit ME, the SICOFI unit SICOFI and the periphery controller ELIC in order to be switched in the switching network KF to the trunk line unit VAE via a switching path set by the computer unit RE. The useful information ni is communicated to the communication network to the service central SZE via the terminal A of the trunk line unit VAE under the control of the computer unit RE. The signaling with the communication network KN is thereby effected by the trunk line unit VAE, whereby the destination and originating call number are calculated or, respectively, identified in the central computer unit ZRE and are communicated to the trunk line unit VAE.

Given a communication of useful information ni from or to the service central via an ISDN communication network, a modulation or, respectively, demodulation of the useful information ni is not required. Consequently, the useful information ni formed in the central computer means ZRE is intermediately stored in the access memory and is subsequently not switched via the modem unit ME and the SICOFI unit SICOFI. This useful information ni is directly communicated using the microprocessor MS to the microprocessor interface MPS of the periphery controller ELIC for the purpose of insertion into a message channel. The signaling with the ISDN communication network KN is essentially implemented in the trunkline unit VAE under the control of the central computer means ZRE (call number determination). To what communication network KN (telephone network or ISDN network) the service central SZE or the trunk line unit VAE is connected is stored in the central computer means ZRE, for example in the database. The setting of the teletransmission module, that is, activation of different control routines in the microprocessor system, into the telephone network or ISDN network mode is consequently implemented by the central computer means ZRE via the compute/bus interface BZR.

The SICOFI unit SICOFI in the teletransmission module FUM is especially advantageously realized by the integrated circuit PEB2260 (Dual channel Kodak Filter) and the exchange unit ELIC is especially advantageously realized by the integrated telecommunication circuit PEB20550 of Siemens AG.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A remotecontrollable communication system having a central computer means to which at least one of subscriber line equipment that is connectable to communication terminal equipment and at least one trunk line unit are connected via at least one PCM-oriented system bus interface and, for an information communication for remotecontrol of the communication system, said communication system being connected to a service central via a communication network, comprising:

a remotetransmission module in the communication system for information communication with the service central via a communication network, said remote transmission module being settable to an information transmission specifically associated to the communication network and signaling;

a first computer/bus interface in said remotetransmission module and connected to a second computer/bus interface in the central computer means, useful information and control information being transmitted according to a predetermined protocol via said first and second computer/bus interfaces; and a first PCM-oriented system/bus interface in said remotetransmission module, said first PCM-oriented system/bus interface being connected to a second PCM-oriented system/bus interface in the central computer means, the useful information and signaling information being communicated via said first and second PCM-oriented system/bus interface.

2. The remotecontrollable communication system according to claim 1, wherein the remotetransmission module comprises:

an access memory for coordinating the information communication between central computer means and the remotetransmission module, said access memory having a computer/bus interface and a processor interface;

a modem unit that modulates or, respectively, demodulates useful information for analog information transmission, said modem unit having a processor interface and an analog telephone interface;

an SICOFI unit having an analog telephone interface connected to the analog telephone interface of the modem unit and having an internal ISDN-oriented system bus interface;

a periphery controller that effects the switching of the useful information and coordinates the signaling information, said periphery controller having an internal ISDN-oriented system/bus interface connected to the internal ISDN-oriented system bus interface of the SICOFI unit, a processor interface, and a PCM-oriented system bus interface; and a microprocessor system that controls and monitors the remotetransmission module and effects control of information flow in the remotetransmission module for different communication networks, said microprocessor system having a processor interface connected via a microprocessor bus to processor interfaces of the periphery controller, of the access memory and of the modem unit.

3. The remotecontrollable communication system according to claim 2, wherein the periphery controller comprises:

a signaling channel controller that realizes the internal ISDN-oriented system/bus interface and that controls the signaling information;

an exchange unit that switches the useful information and that realizes at least one PCM-oriented bus interface; and an interface unit that serially communicates the signaling and useful information and that realizes the processor interface.

4. The remotecontrollable communication system according to claim 2, wherein each of the internal ISDN-oriented system/bus interfaces is formed by:

a respective data line acting in the direction of the central computer means and the modem unit;

a frame synchronous line that communicates frame synchronization signals; and a data acceptance clock line.

5. The remotecontrollable communication system according to claim 2, wherein the modem means has an information transmission method according to CCITT Recommendation V.32bis.

6. The remotecontrollable communication system according to claim 2, wherein the access memory, the modem unit, the SICOFI unit and the periphery controller are integrated telecommunication circuits.

7. The remotecontrollable communication system according to claim 1, wherein the service central remotecontrols at least one communication system and is connected via one of a public communication network and a private communication network to a terminal of the trunk line unit.

8. The remotecontrollable communication system according to claim 7, wherein the information communication between the service central and the central computer means of a respective communication system is effected by a standardized transmission protocol according to CCITT Recommendation X.25.

9. The remotecontrollable communication system according to claim 1, wherein the remotetransmission module has means for plugging the remote transmission module onto an assembly of the central computer means.

10. The remotecontrollable communication system according to claim 1, wherein the remotetransmission module is set to a telephone network mode that realizes analog telephone information transmission and, together with the communication system, realizes analog telephone signaling.

11. The remotecontrollable communication system according to claim 1, wherein the remotetransmission module is set to an ISDN network mode that realizes digital information communication and, together with the communication system, realizes ISDN signaling.

12. A remotecontrollable communication system having a central computer means to which at least one of subscriber line equipment that is connectable to communication terminal equipment and at least one trunk line unit are connected via at least one PCM-oriented system bus interface and, for an information communication for remotecontrol of the communication system, said communication system being connected to a service central via a communication network, comprising:

a remotetransmission module in the communication system for information communication with the service central via a communication network, said remotetransmission module being settable to an information transmission and signaling specifically associated to the communication network and signaling;

a first computer/bus interface in said remotetransmission module and connected to a second computer/bus interface in the central computer means, useful information and control information being transmitted according to a predetermined protocol via said first and second computer/bus interfaces;

a first PCM-oriented system/bus interface in said remotetransmission module, said first PCM-oriented system/bus interface being connected to a second PCM-oriented system/bus interface in the central computer means, the useful information and signaling information being communicated via said first and second PCM-oriented system/bus interface; and the remotetransmission module having, an access memory for coordinating the information communication between central computer means and the remotetransmission module, said access memory having a computer/bus interface and a processor interface, a modem unit that modulates or, respectively, demodulates useful information for analog information transmission, said modem unit having a processor interface and an analog telephone interface, an SICOFI unit having an analog telephone interface connected to the analog telephone interface of the modem unit and having an internal ISDN-oriented system bus interface, a periphery controller that effects the switching of the useful information and coordinates the signaling information, said periphery controller having an internal ISDN-oriented system/bus interface connected to the internal ISDN-oriented system bus interface of the SICOFI unit, a processor interface, and a PCM-oriented system bus interface, and a microprocessor system that controls and monitors the remotetransmission module and effects control of information flow in the remotetransmission module for different communication networks, said microprocessor system having a processor interface connected via a microprocessor bus to processor interfaces of the periphery controller, of the access memory and of the modem unit.

13. The remotecontrollable communication system according to claim 12, wherein the periphery controller comprises:

a signaling channel controller that realizes the internal, ISDN-oriented system/bus interface and that controls the signaling information;

an exchange unit that switches the useful information and that realizes at least one PCM-oriented bus interface; and an interface unit that serially communicates the signaling and useful information and that realizes the processor interface.

14. The remotecontrollable communication system according to claim 12, wherein each of the internal ISDN-oriented system/bus interfaces is formed by:

a respective data line acting in the direction of the central computer means and the modem unit;

a frame synchronous line that communicates frame synchronization signals; and a data acceptance clock line.

15. The remotecontrollable communication system according to claim 12, wherein the service central remote-controls at least one communication system and one of a public communication network and a private communication network to a terminal of the trunk line unit.

16. The remotecontrollable communication system according to claim 12, wherein the remotetransmission module is set to one of a telephone network mode, that realizes analog telephone information transmission and together with the communication system realizes analog telephone signaling, and an ISDN network mode, that realizes digital information communication and together with the communication system realizes ISDN signaling.

17. A remotecontrollable communication system having a central computer means to which at least one of subscriber line equipment that is connectable to communication terminal equipment and at least one trunk line unit are connected via at least one PCM-oriented system bus interface and, for an information communication for remotecontrol of the communication system, said communication system being connected to a service central via a communication network, comprising:

a remotetransmission module in the communication system for information communication with the service central via a communication network, said remotetransmission module being set to one of a telephone network mode that realizes analog telephone information transmission and together with the communication system realizes analog telephone signaling, and an ISDN network mode that realizes digital information communication and together with the communication system realizes ISDN signaling;

a first computer/bus interface in said remotetransmission module and connected to a second computer/bus interface in the central computer means, useful information and control information being transmitted according to a predetermined protocol via said first and second computer/bus interfaces;

a first PCM-oriented system/bus interface in said remotetransmission module, said first PCM-oriented system/ bus interface being connected to a second PCM-oriented system/bus interface in the central computer means, the useful information and signaling information being communicated via said first and second PCM-oriented system/bus interface; and the remotetransmission module having, an access memory for coordinating the information communication between central computer means and the remotetransmission module, said access memory having a computer/bus interface and a processor interface, a modem unit that modulates or, respectively, demodulates the useful information for analog information transmission, said modem unit having a processor interface and an analog telephone interface, an SICOFI unit having an analog telephone interface connected to the analog telephone interface of the modem unit and having an internal ISDN-oriented system bus interface, a periphery controller that effects the switching of the useful information and coordinates the signaling information, said periphery controller having an internal ISDN-oriented system/bus interface connected to the internal ISDN-oriented system bus interface of the SICOFI unit, a processor interface, and a PCM-oriented system bus interface, and a microprocessor system that controls and monitors the remotetransmission module and effects control of information flow in the remotetransmission module for different communication networks, said microprocessor system having a processor interface connected via a microprocessor bus to the processor interfaces of the periphery controller, of the access memory and of the modem unit.

18. The remotecontrollable communication system according to claim 17, wherein the periphery controller comprises:

a signaling channel controller that realizes the internal, ISDN-oriented system/bus interface and that controls the signaling information;

an exchange unit that switches the useful information and that realizes at least one PCM-oriented bus interface; and an interface unit that serially communicates the signaling and useful information and that realizes the processor interface.

19. The remotecontrollable communication system according to claim 17, wherein each of the internal, ISDN-oriented system/bus interface is formed by:

a respective data line acting in the direction of the central computer means and the modem means;

a frame synchronous line that communicates frame synchronization signals; and a data acceptance clock line.

20. The remotecontrollable communication system according to claim 17, wherein the service central remote-controls at least one communication system and is connected via one of a public communication network and a or private communication network to a terminal of the trunk line unit.

* * * * *